United States Patent
Leung

Patent Number: 5,699,338
Date of Patent: Dec. 16, 1997

[54] COMPACT DISC DRIVE

[75] Inventor: Wilson Wai Sing Leung, Hong Kong, Hong Kong

[73] Assignee: Alco Electronics Ltd., Quarry Bay, Hong Kong

[21] Appl. No.: 372,132

[22] Filed: Jan. 13, 1995

[30]  Foreign Application Priority Data

Sep. 6, 1994 [GB] United Kingdom ............ 9417887

[51] Int. Cl.$^6$ ............................................. G11B 33/02
[52] U.S. Cl. ............................................. 369/77.1
[58] Field of Search ................... 369/77.1, 77.2, 369/75.1, 75.2, 246–248, 253; 360/99.08, 99.09

[56]  References Cited

U.S. PATENT DOCUMENTS 4,658,944  4/1987  Kogure et al. .................. 360/99.09
4,831,477  5/1989  Sakamoto et al. .............. 360/99.02
5,163,038  11/1992  Arai ................................. 369/77.01
5,187,701  2/1993  Verheyen ......................... 369/77.1

FOREIGN PATENT DOCUMENTS 61-175966  8/1986  Japan ............................... 369/77.02
61-214168  9/1986  Japan ............................... 369/77.02

Primary Examiner—Stuart S. Levy
Assistant Examiner—Allen Cao
Attorney, Agent, or Firm—Leydig, Voit & Mayer, Ltd.

[57]  ABSTRACT

A compact disc drive includes a casing (11) having a front slot, a tray for supporting a compact disc, the tray being slidable in and out through the slot, and an internal playing mechanism for reading data recorded on a compact disc supported by the tray. A spring is used to resiliently urge the tray out. A spring-loaded latch is provided for holding the tray closed against the action of the spring, automatically, when the tray is pushed closed.

10 Claims, 6 Drawing Sheets

COMPACT DISC DRIVE

TECHNICAL FIELD OF THE INVENTION

The present invention relates to a compact disc drive which has a simplified moving mechanism for the disc tray.

SUMMARY OF THE INVENTION

According to the invention, there is provided a compact disc drive which comprises a casing having a front slot, a tray for supporting a compact disc, said tray being slidable through the slot between a closed position staying substantially inside the casing and an open position projecting substantially out of the casing, a playing mechanism provided inside the casing for reading data recorded on a compact disc supported by the tray, said playing mechanism always staying inside the casing and being movable between a first position close to a said compact disc and a second position away from a said compact disc, spring means for resiliently biassing the tray towards its open position, and a manually operable resiliently biassed latch for holding the tray in its closed position against the action of the spring means automatically when the tray is pushed manually to its closed position.

In a preferred embodiment, the tray is slidable past an immediate position between the closed and open positions, and the spring means is adapted to have a comparatively stronger resilient force acting upon the tray when the tray is sliding between the closed and intermediate positions than when it is sliding between the intermediate and open positions.

It is preferred that the playing mechanism is resiliently biassed towards its second position by the spring means.

Preferably, the playing mechanism is movable between its first and second positions through an arcuate path.

In a preferred arrangement, the playing mechanism has front and rear ends, said rear end being confined to a linear sliding path substantially parallel to the sliding direction of the tray and said front end being confined to another linear sliding path inclined at an angle to the first-mentioned sliding path.

Preferably, the playing mechanism is movable between its first and second positions only when the tray is sliding between its closed and intermediate positions.

In a specific arrangement, the playing mechanism has a part positioned at an intermediate position in the sliding path of the tray such that the tray engages with said part when the tray slides past its intermediate position towards its closed position and disengages therefrom when the tray slides past its intermediate position towards its open position.

Preferably, the spring means is provided by separate springs for resiliently biassing the tray towards its open position and for resiliently biassing the playing mechanism towards its second position.

Conveniently, the spring means is provided by an extension coil spring or springs.

Advantageously, the compact disc drive further includes damping means for controlling or slowing down the sliding movement of the tray.

In particular, the damping means is provided by a stationary rack fixed with respect to the casing and a rotary gear movable with the tray. The rotary gear is in gear engagement with the rack and is applied with a viscous material to provide the damping effect.

The compact disc drive may be for playing audio compact discs.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 6:
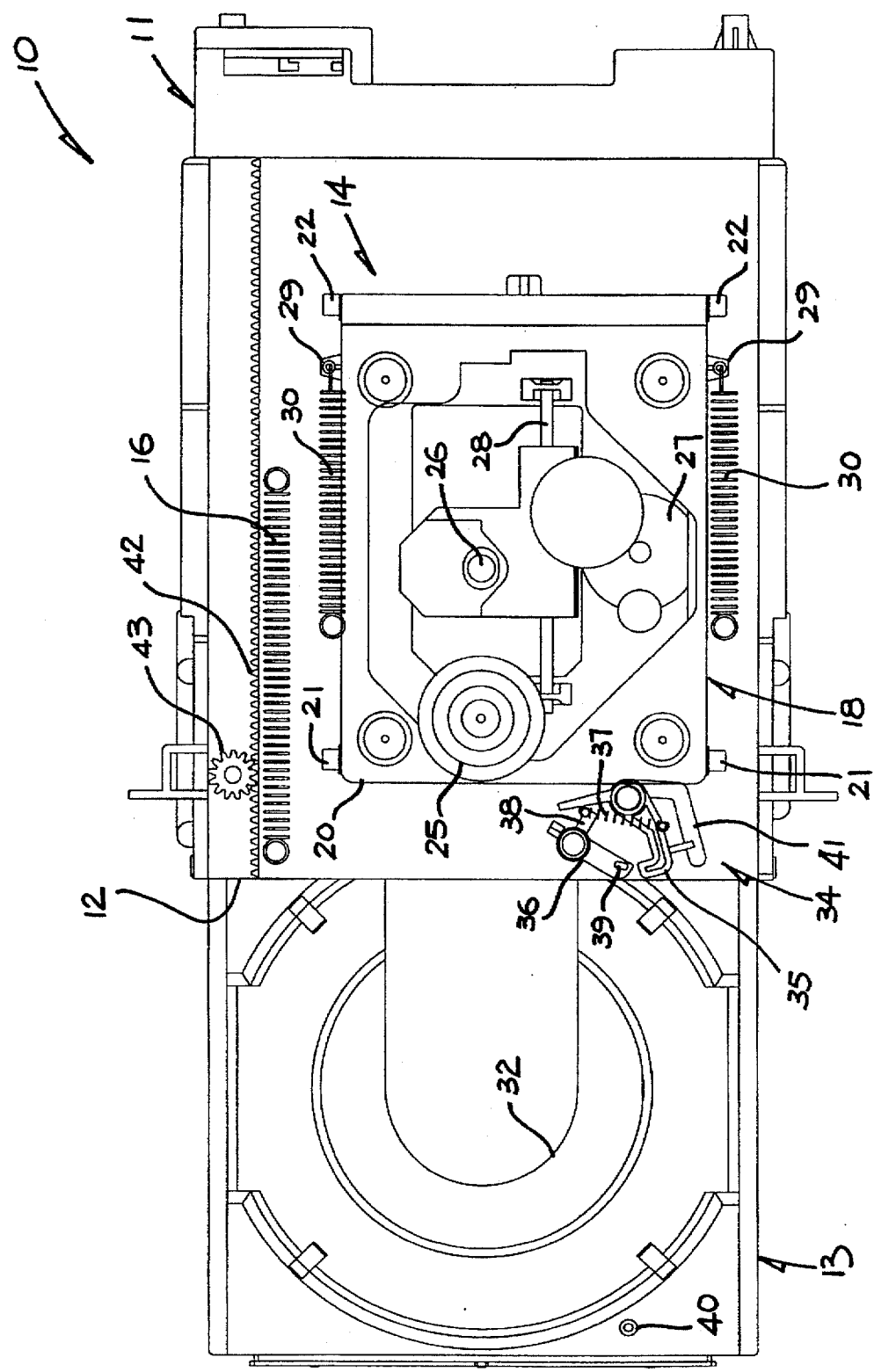
FIG. 6 is a top plan view of the compact disc drive of FIG. 5.

Referring to the drawings, there is shown a compact disc drive 10 embodying the invention, which drive 10 comprises a generally rectangular casing 11 having at its front end a horizontal slot 12, a horizontal tray 13 for holding a compact disc, and an internal playing mechanism for reading data recorded on the said compact disc. The tray 13 is supported within the drive casing 11 for sliding movement between a closed position staying substantially inside the drive casing 11 (FIGS. 1 and 2) and an open position projecting substantially out of the drive casing 11 through the slot 12 (FIGS. 8 and 6). The tray 13 has a rearmost end extension 15, protruding from its rear end, within the left side of the drive casing 11. An extension coil spring 16 is secured at one end to the end extension 18 and at the other end to a part 17 of the drive casing 11 situated immediately underneath the left end of the slot 12. The spring 16 is stretched substantially horizontally for resiliently biassing the tray 13 forwards towards its open position.

The playing mechanism 14 has a generally rectangular hollow body 18 supported within the drive casing 11 for general horizontal sliding movement back-to-front. The body 18 is formed by a horizontal upper part 19 which is guided to slide horizontally and a generally flat lower part 20. The upper body part 19 has at its rear end and on opposite sides thereof a pair of depending hooks 23. The lower body part 20 has at its front end a first pair of opposite side pegs 21 and at its rear end a second pair of opposite side pegs 22, and is hinged with its rear side pegs 22 engaging the corresponding hooks 23.

Figure 1:
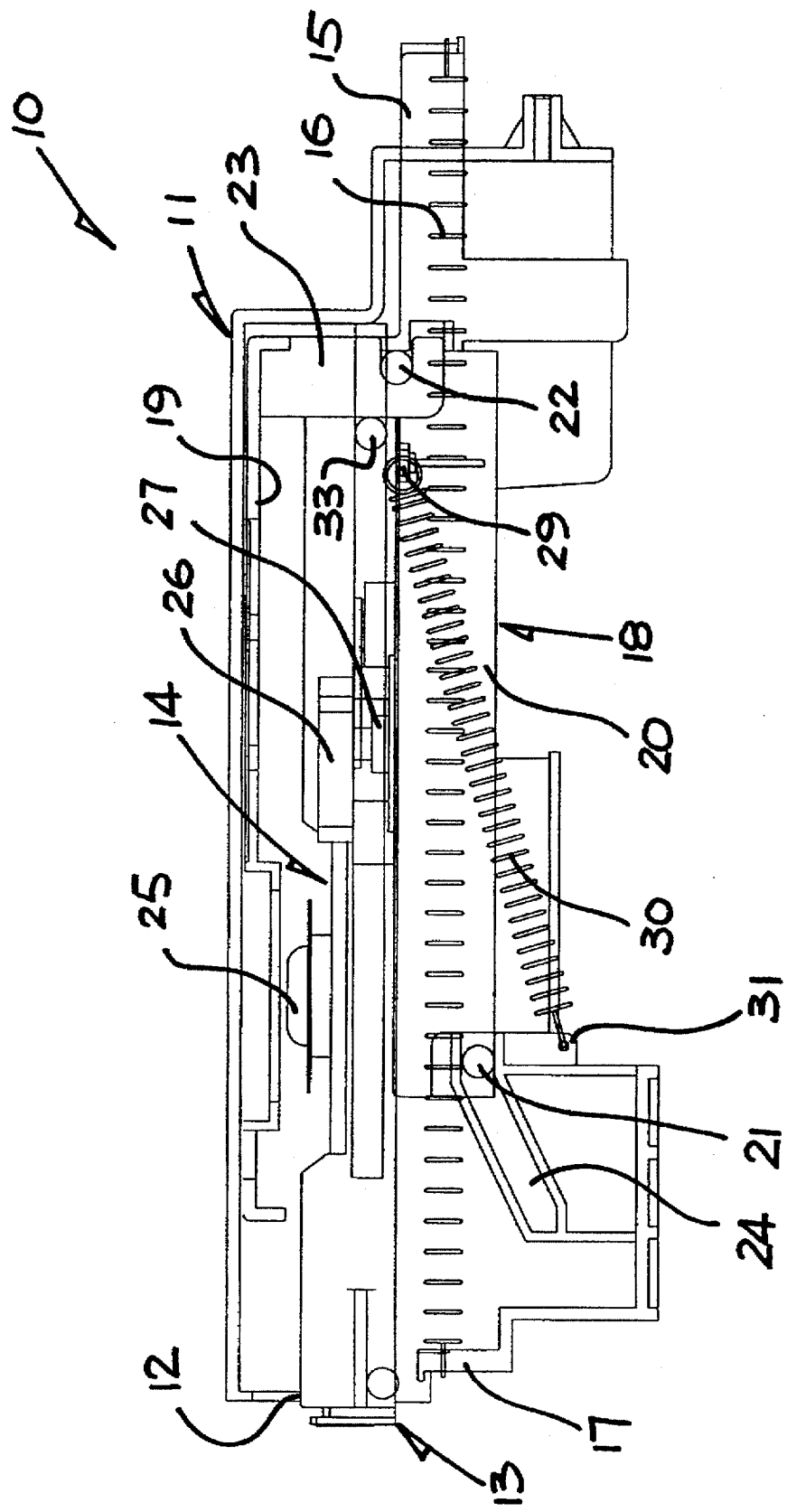
FIG. 1 is a side view of an embodiment of a compact disc drive in accordance with the invention, in a closed condition.
Figure 2:
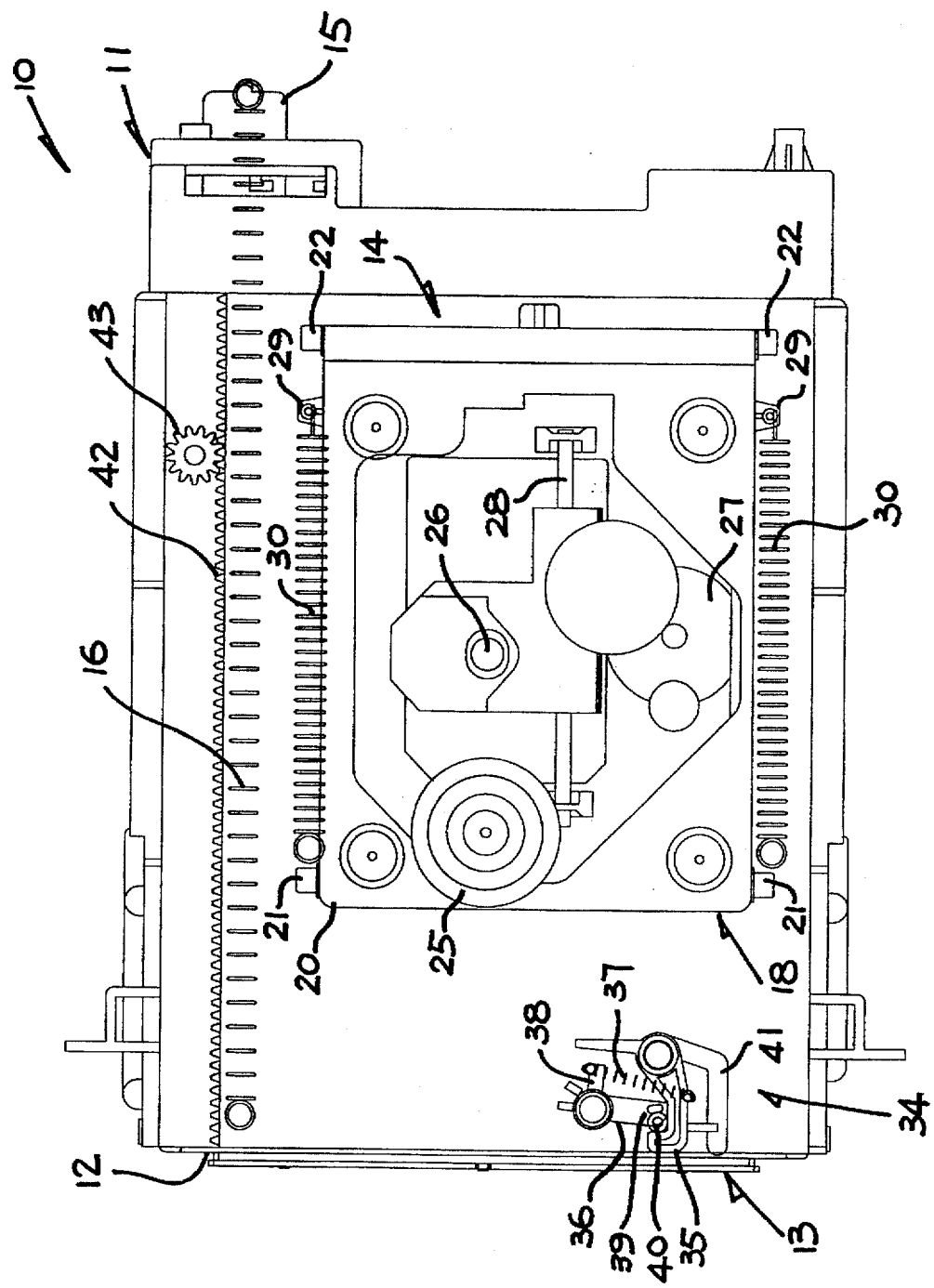
FIG. 2 is a top plan view of the compact disc drive of FIG. 1.

The drive casing 11 has, within its front end and on its opposite internal sides, a pair of opposed inclined tracks 24, within which the front side pegs 21 of the lower body part 20 are slidably engaged, respectively. The tracks 24 extend forwardly downwards at about 30°. Upon backward sliding of the body 18 (the upper body part 19) inside the drive casing 11, the lower body part 20 pivots upwards about its rear side pegs 22 to a first, horizontal position close to the upper body part 19 (FIGS. 1 and 2). When the body 18 (the upper body part 20) slides forward, the lower body part 20 pivots downwards to a second, inclined position away from the upper body part 19 (FIGS. 3 to 6). The position of the rear end of the lower body part 20 at the rear side pegs 22 remains sliding throughout.

The lower body part 20 has a pair of opposite side lugs 29 provided a short distance in front of the corresponding rear side pegs 22. On each side of the lower body part 20, an inclined extension coil spring 30 is secured at one end to the respective side lug 29 and at the other end to a part 31 of the drive casing 11 below the respective track 24. The two springs 30 thus extend forwardly downwards and are tensioned to resiliently bias the lower body part 20 downwards towards its second position (off the upper body part 19). The springs 30 also resiliently bias the whole playing mechanism 14 forward towards a foremost position (FIGS. 3 to 6) which is defined by the front end of the upper body part 19 abutting the inner side of the front end wall of the drive casing 11. This foremost position of the playing mechanism 14 corresponds to the second position of the lower body part 20. The playing mechanism 14 always stays completely inside the drive casing 11.

The playing mechanism 14 is formed by a motor-driven capstan 25 for engaging through the centre hole of a compact disc held in the tray 13 in order to turn the compact disc at high speed, and a laser pick-up lens 26 arranged to be driven by a DC motor 27 to slide gradually along a straight track 28 extending radially relative to the turning compact disc in order to read the data recorded thereon. All these components are mounted on the lower body part 20.

Figure 3:
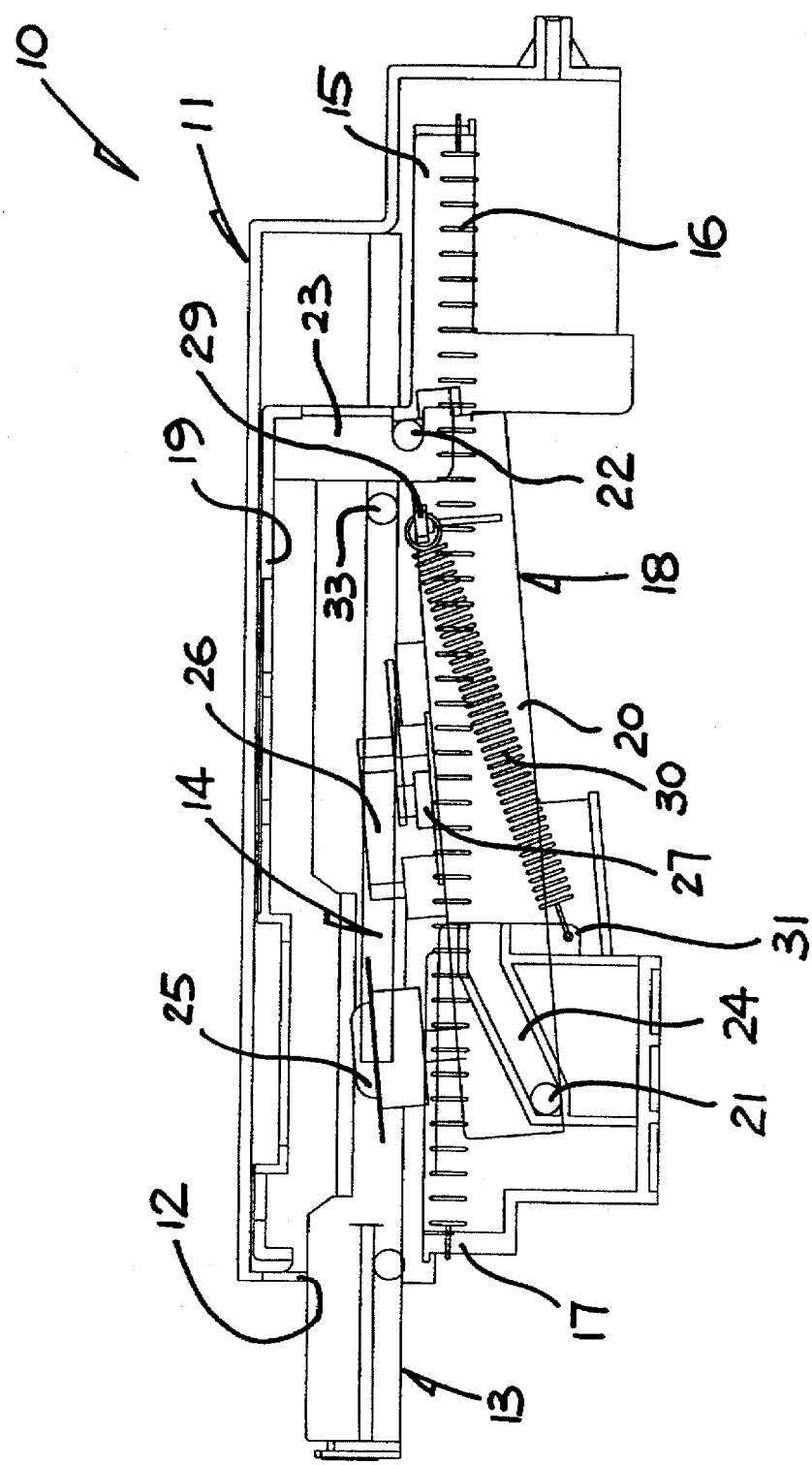
FIG. 3 is a side view of the compact disc drive of FIG. 1, in a partially-open condition.
Figure 4:
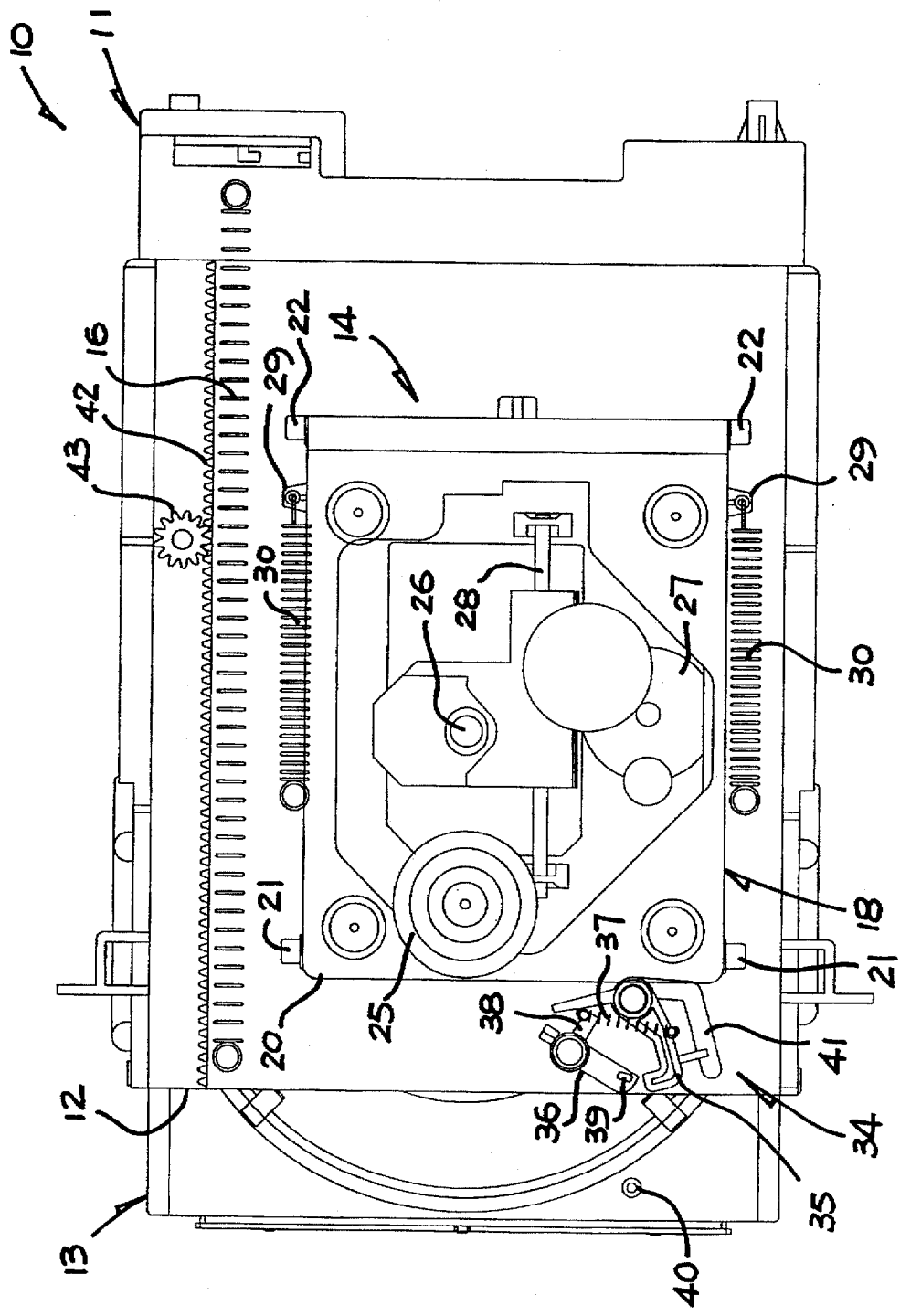
FIG. 4 is a top plan view of the compact disc drive of FIG. 3.
Figure 5:
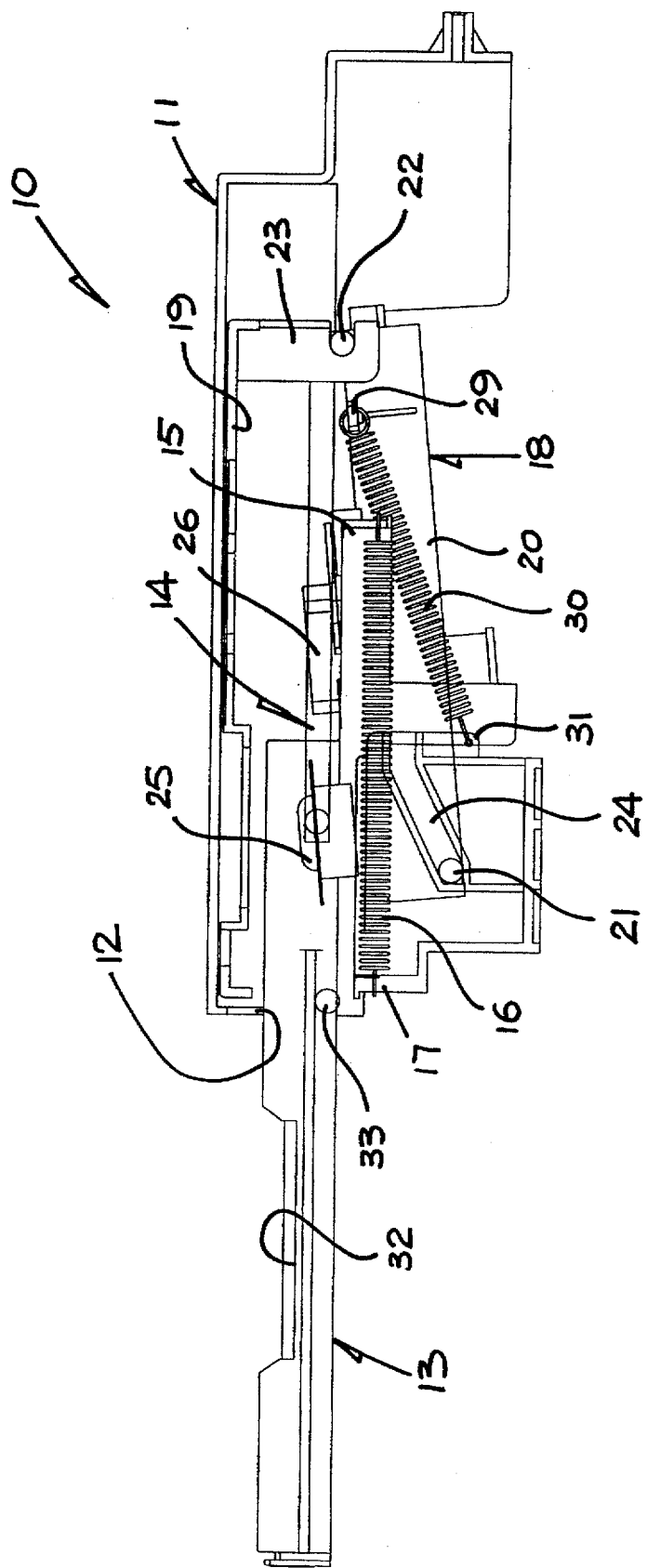
FIG. 5 is a side view of the compact disc drive of FIG. 1, in a fully-open condition.

The tray 13 has a relatively wide central slot 32 extending from the centre region to the rear end of the tray 13. The tray 13 further comprises a pair of opposite side pegs 33 at about its mid-length (including the end projection 15). The playing mechanism 14 is positioned with its upper body part 19 above and its lower body part 20 below the sliding path of the tray 13. The two side pegs 33 are aligned with the corresponding rear hooks 23 such that when the tray 13 is manually slid backward from its open position (FIGS. 5 and 6), the tray 13 will at an intermediate (partially open/closed) position bear with its side pegs 33 against the corresponding hooks 23 (FIGS. 3 and 4). Upon further backward movement, the tray 13 will push the whole playing mechanism 14 backward (off the foremost position) until the tray 13 reaches its closed position and the playing mechanism 14 simultaneously reaches its rearmost position (FIGS. 1 and 2). Over the entire period when the tray 13 travels from its intermediate to its closed position, the lower body part 20 of the playing mechanism 14 starts moving from its second position and reaches its first position along an arcuate path. Over the same period, the driving capstan 25 moves upwards through the slot 32 of the tray 13 and finally engages completely with the centre hole of a compact disc supported in the tray 13.

Upon forward movement of the tray 13 under the action of the spring 16 from its closed position to its intermediate position, the whole playing mechanism 14 will be moved simultaneously from its rearmost to its foremost position under the action of the springs 30 (from FIGS. 1 and 2 to FIGS. 3 and 4). During this time period, the lower body part 20 will be pivoted down by the springs 30 from its first to its second position. Once the playing mechanism 14 has reached its foremost position, the biassing action of the springs 30 will terminate and the tray 13 alone will continue to travel forwards until reaching its open position (from FIGS. 3 and 4 to FIGS. 5 and 6). When the playing mechanism 14 is moving from its rearmost to its foremost position, the driving capstan 25 moves downward through the slot 32 of the tray 13, thereby disengaging from the centre hole of a compact disc held in the tray 13.

It is clear from above that the playing mechanism 14 moves only when the tray 13 is moving between the intermediate and the closed positions. Only over this period the springs 30 come into action, which therefore adds to the force provided by the spring 16 to slide the tray 13 outwards through the slot 12. This additional force assists the tray 13 (and the compact disc placed therein) to overcome its inertia, thereby effecting a swift ejecting action, at least initially. In the opposite direction, the additional force also provides a cushioning or damping effect just before the tray 13 is pushed back to its closed position, thereby reducing the risk of a jerk or damage.

The compact drive 10 further includes a spring-biassed latch 34, provided inside the front end and immediately below the slot 12 of the drive casing 11, for automatically latching the tray 13 closed when the tray 13 is manually slid backward to reach its closed position. The latch 34 is forward by a hinged hook 35, a hinged L-shaped member 36 (both being pivotable horizontally) and a horizontal extension coil spring 37. The spring 37 is secured at one end to a position at mid-length of the hook 35 and at the other end to a relatively shorter limb 38 of the L-shaped member 36. In the equilibrium condition of the spring 37, the free ends of the hook 35 and a relatively longer limb 39 of the L-shaped member 36 are positioned side-by-side, as shown in FIGS. 4 and 6 when the tray 13 is off the latch 34. The tray 13 has a short vertical stud 40 which is aligned with the free end of the L-shaped member longer limb 39, said free end extending at an angle with respect to the stud 40.

In operation, when the tray 13 is pushed back into the drive casing 11 through the slot 12, the stud 40 of the tray 13 will eventually engage the free end of the longer limb 39 of the L-shaped member 36, thereby pivoting the L-shaped member 36 inwards. The moving shorter limb 38 will in turn pivot the hook 35 close through the spring 37, thereby causing the hook 35 to engage the stud 40 and thus retain the tray 13 in the closed position. The hook 35 engages the stud 40 in the direction of travel of the tray 13 such that the tray 13 cannot be moved out by the spring 16.

The hook 35 has an auxiliary member 41 mounted thereon in a parallel manner on the external side thereof. A push-button (not shown)is provided directly in front of the auxiliary member 41 such that upon pressing the push-button pressure is brought to bear against the auxiliary member 41 which causes the hook 35 to pivot off of the stud 40. As a result, the tray 13 will be released and hence slid out of the drive casing 11 by the spring 16.

In order to control or slow down the sliding movement of the tray 13, a damper is provided. The damper is provided by an elongate (toothed) rack 42 fixed internally on and extending longitudinally along the left side of the drive casing 11 and by a pinion 43 rotatably mounted on the left side of the rear end of the tray 13, said pinion 43 being in gear engagement with the rack 42. A viscous silicone grease is smeared along the rack 42 and around the pinion 43, which slows down the rotation of the pinion 43 along the rack 42 and hence the sliding movement of the tray 13 relative to the drive casing 11.

It will be appreciated that the compact disc drive of this invention may be used in audio or video compact disc player is such as music and/or TV game compact disc players as well as in computers as a CD-ROM drive.

The invention has been given by way of example only, and various modifications of and/or alterations to the described embodiment may be made by persons skilled in the art without departing from the scope of the invention as specified in the appended claims.

What is claimed is:

1. A compact disc drive comprising:

a casing having a front slot;

a tray for supporting a compact disc, said tray including an aperture and being slidable along a path through the slot between a closed position substantially inside said casing and an open position projecting substantially outside of said casing;

a playing mechanism including a driving capstan and a reading device, said playing mechanism being disposed inside said casing for reading data recorded on the compact disc supported by said tray, said playing mechanism always staying inside said casing and being movable between a first position close to the compact disc, in which said driving capstan is disengaged from the aperture, and a second position away from the compact disc in which said driving capstan is disengaged from the aperture;

a first spring arranged to resiliently bias said tray towards the open position, said tray being urged against said playing mechanism and said playing mechanism being moved by said tray towards the first position as said tray is moved toward the closed position;

a second spring arranged to resiliently bias said playing mechanism towards the second position, the path of said tray including an intermediate position between the closed position and the open position, said tray being slidable past the intermediate position, said tray being arranged to engage said playing mechanism when said tray is between the intermediate and closed positions such that said first and second springs cooperate to provide a comparatively stronger resilient force acting upon said tray when said tray is slid between the closed and intermediate positions than when said tray is slid between the intermediate and open positions by said first spring; and a manually operable resiliently biassed latch for holding said tray in the closed position against urging of said first and second springs when said tray is pushed manually to the closed position.

2. The compact disc drive as claimed in claim 1, wherein said playing mechanism is movable between the first and second positions through an arcuate path.

3. The compact disc drive as claimed in claim 2, wherein said playing mechanism has front and rear ends, said rear end being confined to a first linear sliding path substantially parallel to a sliding direction of said tray and said front end is confined to a second linear sliding path inclined at an angle to the first sliding path.

4. The compact disc drive as claimed in claim 1, wherein said first and second springs include coil springs.

5. The compact disc drive as claimed in claim 1, further including damping means for slowing sliding movement of said tray.

6. The compact disc drive as claimed in claim 5, wherein said damping means includes a stationary rack fixed with respect to said casing and a rotary gear movable with said tray, said rotary gear being in engagement with said rack and said rotary gear including a viscous material for damping.

7. The compact disc drive as claimed in claim 1, for playing audio compact discs.

8. A compact disc drive comprising:

a casing having a front slot;

a tray for supporting a compact disc, said tray including an aperture and being slidable along a path through the slot between a closed position substantially inside said casing and an open position projecting substantially outside of said casing;

a playing mechanism including a driving capstan and a reading device, said playing mechanism being disposed inside said casing for reading data recorded on the compact disc supported by said tray, said playing mechanism always staying inside said casing and being movable between a first position close to the compact disc, in which said driving capstan is disengaged from the aperture, and a second position away from the compact disc in which said driving capstan is disengaged from the aperture;

a first spring arranged to resiliently bias said tray towards the open position, said tray being urged against said playing mechanism, and said playing mechanism being moved by said tray towards the first position as said tray is moved toward the closed position;

a second spring arranged to resiliently bias said playing mechanism towards the second position, said playing mechanism including a structural member positioned at an intermediate position in the path of said tray such that said tray engages said structural member when said tray is slid past the intermediate position towards the closed position and said tray disengages from said structural member when said tray is slid past the intermediate position towards the open position;

a second spring arranged to resiliently bias said playing mechanism towards the second position; and a manually operable resiliently biased latch for holding said tray in the closed position against urging of said first and second springs when said tray is pushed manually to the closed position.

9. The compact disc drive as claimed in claim 8, wherein said playing mechanism is movable between the first and second positions through an arcuate path.

10. The compact disc drive as claimed in claim 9, wherein said playing mechanism has front and rear ends, said rear end being confined to a first linear sliding path substantially parallel to a sliding direction of said tray and said front end is confined to a second linear sliding path inclined at an angle to the first sliding path.

* * * * *